Feb. 13, 1940.   M. SHARKEY   2,190,491

AUTOMATIC JACK BLOCK FOR CARS

Filed July 18, 1939

INVENTOR
Michael Sharkey
BY
ATTORNEY

Patented Feb. 13, 1940

2,190,491

UNITED STATES PATENT OFFICE 2,190,491

AUTOMATIC JACK BLOCK FOR CARS

Michael Sharkey, Brooklyn, N. Y.

Application July 18, 1939, Serial No. 285,043

8 Claims. (Cl. 254—88)

This invention relates to new and useful improvements in an automatic jack block for automobiles.

The invention has for an object the construction of a device as mentioned which is characterized by a runway having a depressible raised central portion and inclined ends upon which the wheels of an automobile may be engaged, and an arrangement whereby the weight of the automobile may be used to depress the central portion, and subsequently the energy produced by the weight of the automobile be used to jack up an automobile.

More specifically the invention proposes the use of a spring motor and mechanism associated therewith by which energy from the raised automobile, when moving downwards may subsequently be used to jack up a car.

With this arrangement it is possible to drive an automobile so that one wheel engages the depressible raised central portion and then to manipulate the device for first storing energy and then utilizing this energy for jacking purposes. Of course one automobile may be used to produce the stored energy, and the same automobile at a subsequent time or different automobiles may be jacked by this device.

Still further the invention proposes the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
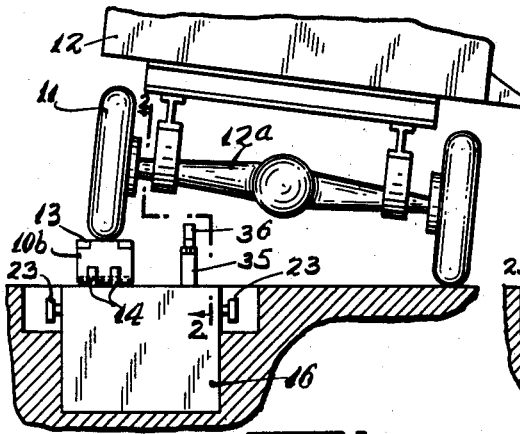
Fig. 1 is a fragmentary rear elevational view of an automobile and associated jack block mechanism in accordance with this invention.

The automatic jack block for automobiles in accordance with this invention includes a runway 10 upon which one wheel 11 of an automobile 12 may be driven. This runway 10 has a depressible central portion 10$^a$ and end portions 10$^b$. The wheel 11 may be driven either way up the inclined portions and brought to a position of rest on the central portion 10$^a$.

Each end portion 10$^b$ is connected with an end of the central portion 10$^a$ by a hinge construction 13. The free end of each end portion is provided with rollers 14 which rest upon the ground and are capable of movably supporting the free ends of the end portions. The central portion 10$^a$ on its bottom face, is provided with guide rods 15 which extend vertically downwards, and engage through complementary receiving openings formed in the top of a hollow body 16 which is embedded below the surface of the ground or floor.

A bar 17 is also connected with the central portion 10$^a$ and extends vertically downwards into the body 16, and is associated with a means for releasably holding the central portion in a raised or in a depressed position. This means includes rack teeth 19 formed upon one face of the bar 17 and engaged by a rock head 20. This rack head 20 is mounted on a stem 21 slidably supported in a bearing 22. The stem 21 extends from the body 16 and its extended end is provided with a head 23 by which it may be moved. A spring 24 is coaxially mounted upon the stem and acts between the bearing 22 and the head 20 for normally urging the rack head in an operative position. The head 23 is located in an opening 25 formed in the floor or ground immediately adjacent the body 16.

A spring motor is associated with the device and connected to receive and store power. This spring motor includes a drum 26 within which a spring 27 is housed. The drum 26 has an open end across which a disc 28 extends. A shaft 29 supports the disc 28 and extends into the drum 26. The inner end of the spring 27 is connected with the shaft 29 by a fastening element 30. The drum 26 is fixedly supported upon a rotative shaft 31.

A transmission system connects the bar 17 with the drum 26. This transmission system includes a gear transmission system 32 having a pinion 32$^a$ at one end meshing with rack teeth 33 formed on the bar 17. The pinion 32$^a$ is fixedly mounted upon a rotatively supported shaft 50 which carries a large gear 32$^b$ which in turn meshes with a pinion 32$^c$. The pinion 32$^c$ is fixedly mounted upon a shaft 51 which carries a large gear 32$^d$. The transmission system 32 terminates in a pinion 32$^e$ mounted upon the shaft 31. The pinion 32$^e$ meshes with the gear 32$^d$. The pinion 32$^a$ and the gear 32$^d$ do not mesh. The arrangement is such that when the bar 17 moves downwards the motion will be transmitted to rotate the shaft 31 which in turn will wind the outside end of the spring 27. Suitable bearings 34 are provided for supporting the shaft 31 and the shafts of the transmission system.

A jack arm 35 projects from the body 16 and at its upper end has an adjustably mounted yoke 36 adapted to engage beneath the axle 12$^a$ of the automobile 12 for jacking up one wheel of the automobile. The yoke 36 has a thread stem 36$^a$ which threadedly engages into the top end of the jack arm 35. A nut 38 is mounted upon the threaded stem and engages the end of the jack arm 35 for locking the yoke in desired extended positions upon the jack arm.

A transmission system is provided for raising the jack arm, and this transmission system is operable by the spring motor previously referred to. The transmission system includes a gear transmission system 38. This gear transmission system has a pinion 38$^a$ at one end meshing with rack teeth 39 formed at one side of the jack arm 35. The pinion 38$^a$ is fixedly mounted upon a shaft 52 which carries a large gear 38$^b$. The gear 38$^b$ meshes with a pinion 38$^c$ fixedly mounted upon a rotative shaft 53. A gear 38$^d$ is also mounted upon the shaft 53. The transmission system 38 terminates in a pinion 38$^e$ mounted upon the shaft 29 and which meshes with the gear 38$^d$. A means is provided for releasably holding the jack arm 35 in a raised or in a depressed position. This means includes rack teeth 40 mounted upon one side of the jack arm 35 and engaged by a rack head 41. The rack head 41 is mounted on a stem 42 slidably supported in a bearing 43. The stem projects from the body 16. Its outer end is provided with a knob 44 by which it may be moved. This knob is located in a recess 45 formed in the floor or ground immediately adjacent the body 16. A spring 46 is associated with the stem 42 and acts between the one side of the bearing 43 and the rack head 41 for urging the rack head into engagement with the rack teeth 40.

The bottom end of the bar 17 is connected with a dash pot 48 adapted to prevent too rapid motion of the bar 17. The dash pot 48 includes a casing or cylinder in which there is a piston 49. This piston is connected with the bottom end of the bar 17. A strong spring 50 normally tends to urge the piston into a raised position.

A valve 51 controls the escape of air from the interior of the dash pot. The arrangement is such that when the bar 17 moves downwards the valve 51 closes and then only the bleed 51' in the valve permits the escape of air from the dash pot housing 48$^a$. Another dash pot 48' is constructed substantially identical to the previously mentioned dash pot and is connected with the bottom end of the jack arm 35. This dash pot 48' prevents the jack arm 35 from moving downwards too rapidly.

Figure 3:
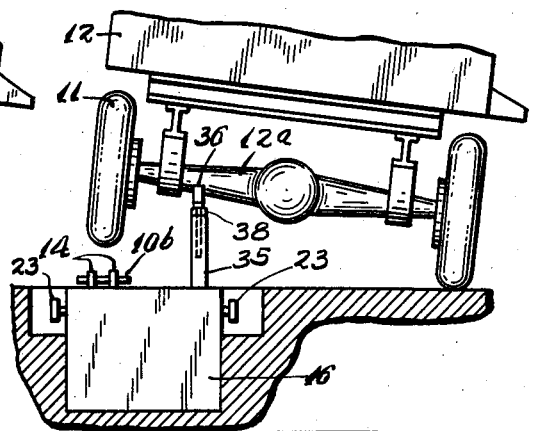
Fig. 3 is a view similar to Fig. 1 but illustrating the automobile jacked up by the automatic jack block device.
Figure 6:
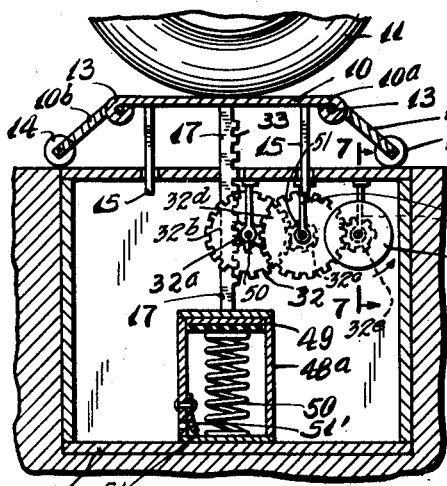
Fig. 6 is a fragmentary vertical sectional view taken on the line 6—6 of Fig. 5.
Figure 5:
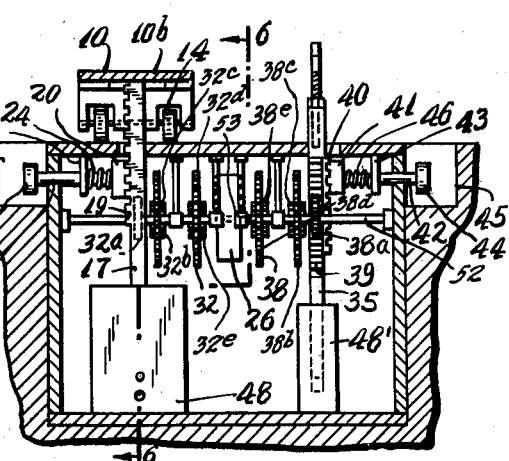
Fig. 5 is a fragmentary enlarged transverse sectional view of a portion of Fig. 1.

The operation of the device is as follows:

The automobile is driven so that one wheel 11 thereof runs up on the runway and rests on the depressible central portion 10$^a$. Then the operator of the device moves the stem 21 by gripping the knob 23 and pulling outwards. This causes the rack head 20 to disconnect from the rack teeth 19 of the bar 17. The central portion 10$^a$ of the runway will now be depressed by the weight of the automobile. The bar 17 will move down slowly due to the dash pot 48 being connected with the bottom of the bar 17. As the bar 17 moves downwards the transmission system 32 will transmit motion from the bar 17 to wind the spring 27 on the spring motor. When the depressible central portion 10$^a$ has reached its fully depressed condition, as illustrated in Fig. 3, then the knob 23 is released so that the spring 24 returns the stem 21 to its original position. In this position the rack head 20 engages the rack teeth 19 and the bar 17 is locked in its depressed condition.

The vehicle 12 may then be driven away. When desired the same or another vehicle may be placed in position over the jack arm 35. Then the knob 44 may be moved to release the ratchet head 41 from its engagement with the ratchet teeth 40. The jack arm 35 is now free and the spring motor which includes the spring 27 will now function through the transmission system 38, to raise the jack arm 35 and so jack up the vehicle. It should be noted that in the jacked up position of the vehicle, as illustrated in Fig. 3, the wheel 11 is completely free so that its tire may be removed.

The yoke 36 may be manually raised or lowered relative to the jack arm 35 so that it engages as closely as possible against the bottom of the axle 12$^a$ of the automobile. This will prevent wasting of some of the stored up power of the spring motor which will be used in raising the jack arm 35.

Figure 2:
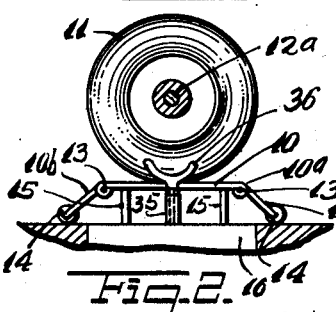
Fig. 2 is a vertical sectional view taken on the line 2—2 of Fig. 1.
Figure 4:
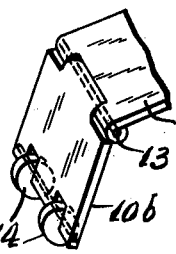
Fig. 4 is a fragmentary perspective view of a portion of the runway of the device.
Figure 7:
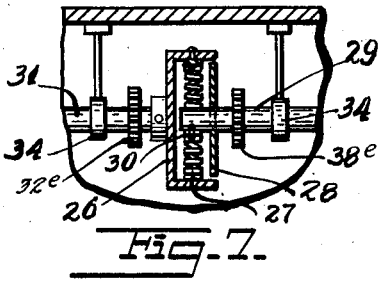
Fig. 7 is a fragmentary vertical sectional view taken on the line 7—7 of Fig. 6.
Figure 8:
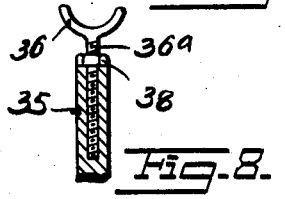
Fig. 8 is a fragmentary enlarged sectional detailed view of a portion of the jack arm of the device.

To lower the vehicle from its jacked up position illustrated in Fig. 3, it is merely necessary that the knob 23 be pulled out so as to release the rack head 20 from the teeth 19. It is also necessary that the knob 33 be drawn out to release the rack head 41 from the teeth 40. Now the weight of the vehicle will move the jack arm 35 downwards. The automobile may now be driven off of the yoke 36. The spring 50 will assist in returning the runway 10 back to its initial raised position illustrated in Figs. 1 and 2. The device is now ready to be reoperated as already described.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An automatic jack block for automobiles, comprising a runway having a depressible raised central portion and inclined ends upon which the wheel of an automobile may be engaged upon, means for releasably holding said raised central portion in a raised or a depressed position, a spring motor, a transmission system for winding said spring motor operable by depression of said central portion, a jack arm for raising said automobile, a transmission system for raising said jack arm operable by said spring motor, and means for releasably holding said jack arm in a raised or a depressed position.

2. An automatic jack block for automobiles, comprising a runway having a depressible raised central portion and inclined ends upon which the wheel of an automobile may be engaged upon, means for releasably holding said raised central portion in a raised or a depressed position, a spring motor, a transmission system for winding said spring motor operable by depression of said central portion, a jack arm for raising said automobile, a transmission system for raising said jack arm operable by said spring motor, and means for releasably holding said jack arm in a raised or a depressed position, the end portions of said runway being hingedly connected with said central portion.

3. An automatic jack block for automobiles, comprising a runway having a depressible raised central portion and inclined ends upon which the wheel of an automobile may be engaged upon, means for releasably holding said raised central portion in a raised or a depressed position, a spring motor, a transmission system for winding said spring motor operable by depression of said central portion, a jack arm for raising said automobile, a transmission system for raising said jack arm operable by said spring motor, and means for releasably holding said jack arm in a raised or a depressed position, the end portions of said runway being hingedly connected with central portion, and the free ends of the end portions being provided with rollers engaging the ground.

4. An automatic jack block for automobiles, comprising a runway having a depressible raised central portion and inclined ends upon which the wheel of an automobile may be engaged upon, means for releasably holding said raised central portion in a raised or a depressed position, a spring motor, a transmission system for winding said spring motor operable by depression of said central portion, a jack arm for raising said automobile, a transmission system for raising said jack arm operable by said spring motor, and means for releasably holding said jack arm in a raised or a depressed position, said means for releasably holding the central portion including a bar connected with the central portion and having rack teeth, and a rack latch engaging said teeth for holding the bar against motion.

5. An automatic jack block for automobiles, comprising a runway having a depressible raised central portion and inclined ends upon which the wheel of an automobile may be engaged upon, means for releasably holding said raised central portion in a raised or a depressed position, a spring motor, a transmission system for winding said spring motor operable by depression of said central portion, a jack arm for raising said automobile, a transmission system for raising said jack arm operable by said spring motor, and means for releasably holding said jack arm in a raised or a depressed position, said spring motor including a cylindrical housing containing a spring which is connected at one end with the housing, and a shaft engaging through said housing and connected with the other end of said spring.

6. An automatic jack block for automobiles, comprising a runway having a depressible raised central portion and inclined ends upon which the wheel of an automobile may be engaged upon, means for releasably holding said raised central portion in a raised or a depressed position, a spring motor, a transmission system for winding said spring motor operable by depression of said central portion, a jack arm for raising said automobile, a transmission system for raising said jack arm operable by said spring motor, and means for releasably holding said jack arm in a raised or a depressed position, said transmission systems comprising gear transmission systems.

7. An automatic jack block for automobiles, comprising a runway having a depressible raised central portion and inclined ends upon which the wheel of an automobile may be engaged upon, means for releasably holding said raised central portion in a raised or a depressed position, a spring motor, a transmission system for winding said spring motor operable by depression of said central portion, a jack arm for raising said automobile, a transmission system for raising said jack arm operable by said spring motor, and means for releasably holding said jack arm in a raised or a depressed position, said jack arm having a yoke at its top end, and means for holding said yoke in various vertical adjusted positions on the said jack arm.

8. An automatic jack block for automobiles, comprising a runway having a depressible raised central portion and inclined ends upon which the wheel of an automobile may be engaged upon, means for releasably holding said raised central portion in a raised or a depressed position, a spring motor, a transmission system for winding said spring motor operable by depression of said central portion, a jack arm for raising said automobile, a transmission system for raising said jack arm operable by said spring motor, and means for releasably holding said jack arm in a raised or a depressed position, comprising rack teeth upon said jack arm and a rack latch cooperative with said rack teeth.

MICHAEL SHARKEY.